Figure 1:
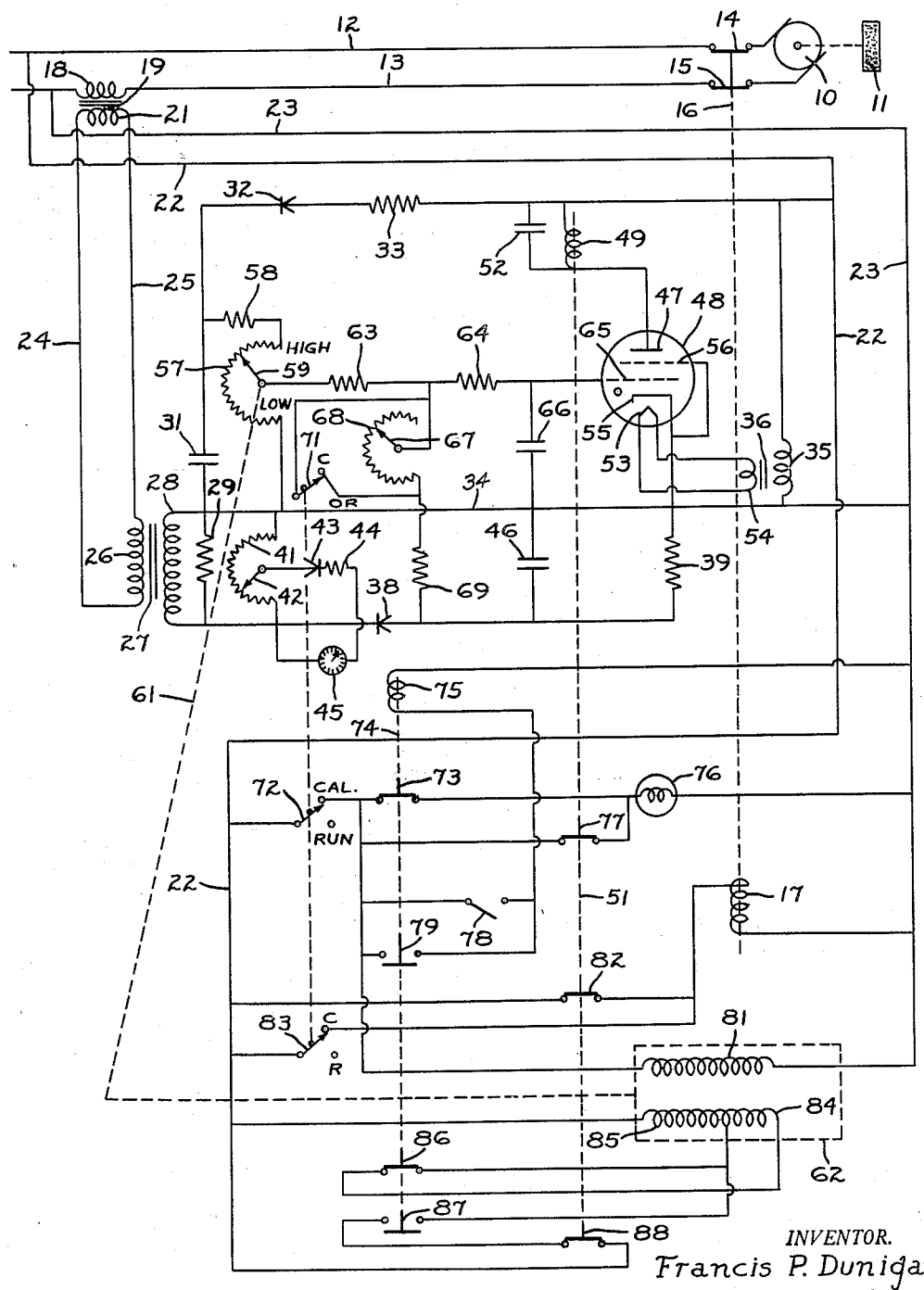

Jan. 24, 1961  F. P. DUNIGAN  2,969,493
CONTROL APPARATUS
Filed Feb. 25, 1957

INVENTOR.
Francis P. Dunigan
BY
Norman S. Blodgett
Attorney

United States Patent Office 2,969,493
Patented Jan. 24, 1961

2,969,493

CONTROL APPARATUS

Francis P. Dunigan, Holden, Mass., assignor to Machinery Electrification, Inc., Northborough, Mass., a corporation of Massachusetts Filed Feb. 25, 1957, Ser. No. 642,188

5 Claims. (Cl. 318—434)

This invention relates to a control apparatus and more particularly to apparatus for producing changes in the energization of a motor when its load exceeds a predetermined maximum.

There are many situations in the electrical control of machinery and processes where it is desired not only to change the operation when certain limits of a variable characteristic are exceeded, but also to change the limits in response to a new cycle as demonstrated by a hand operation. An example of this exists in the operation of a grinding machine; when the load on the main drive motor exceeds a certain amount, it is an indication that the wheel needs to be changed and the motor should be shut down. Furthermore, it would be desirable to have an automatic means for determining and setting the maximum permissible load with a new workpiece and a new grinding cycle. The function of measuring load and shutting off the motor when a preselected load level is exceeded was shown in the patent to Dunigan No. 2,722,648, but the automatic selection of load level has yet to be demonstrated. This deficiency of the prior art has been obviated in a novel manner by the present invention.

It is therefore an outstanding object of the invention to provide a control apparatus for changing the mode of an operation when a limit of a variable characteristic associated therewith is exceeded and for automatically setting a new limit with a new cycle of operation.

Another object of the invention is the provision of a control for terminating a machine cycle when a preselected load level is exceeded and for automatically setting a new load level upon operation with another machine cycle.

It is a further object of the invention to provide a load control for a machine tool, wherein a limiting level of load is determined during the first cycle of operations and is retained during subsequent cycles.

A still further object of this invention is the provision of a control which automatically sets the load limit of a machine during a calibration run.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawing forming a part thereof, in which:

The single figure of the drawing is a schematic view of an apparatus making use of the principles of the invention.

Referring to the drawing, an electric motor 10 is shown connected to a load 11, the motor being energized through alternating current power lines 12 and 13. The lines are connected to the motor through normally-closed contactors 14 and 15, respectively, of a relay 16, which relay has a coil 17. The line 13 contains the primary 18 of a current transformer 19 which has a secondary 21 associated therewith. Power lines 22 and 23 are connected to the lines 12 and 13, respectively.

Lead lines 24 and 25 are connected to opposite ends of the secondary 21 of the current transformer and, at their other ends, to the primary 26 of a transformer 27. A secondary 28 of this transformer has a resistor 29 connected across its ends. One end of the secondary is connected to one side of a capacitor 31, the other side of which is connected to one side of a rectifier 32; the other side of the rectifier is connected through a resistor 33 to the line 22. The rectifier is connected to permit current flow only in the direction from the resistor 33 to the capacitor 31. The same end of the secondary 28 that is connected to the capacitor 31 is also connected to the line 23 by means of a line 34. The primary 35 of a filament transformer 36 is connected at one end to the line 34 adjacent its connection to the power line 23 and at the other end to a line 37 joining the resistor 33 to the line 22.

The other end of the secondary 28 of the transformer 27 is connected through a rectifier 38 and a resistor 39 to the line 34 at a point adjacent its connection with the power line 23. The rectifier 38 is arranged to permit the flow of current only in the direction from the resistor 39 to the secondary 28. A variable resistor or potentiometer 41 is connected across the resistor 29 and the secondary 28. The contact arm 42 of the potentiometer is connected through a rectifier 43 and a resistor 44 to one side of a voltage meter 45 calibrated to read load; the other side of the meter is connected between the rectifier 38 and the respective end of the secondary. A capacitor 46 is connected across the resistor 39.

The plate 47 of a gas-filled tetrode 48 is connected to one end of the coil 49 of a relay 51, the other end of the coil being connected to the line 37. A capacitor 52 is connected across the coil. The filament 53 of the tetrode is connected to the secondary 54 of the filament transformer 36. The cathode 55 of the tetrode is connected to the screen 56 and to the line 34.

One end of a potentiometer 57 is connected to the line 34 adjacent the connection of the potentiometer 41 thereto; the other end is connected through a resistor 58 to the connection between the capacitor 31 and the rectifier 32. The contact arm 59 of the potentiometer is mechanically driven from one end of the potentiometer to the other by a shaft 61, shown schematically, which is connected to a motor 62. The contact arm is connected electrically through resistors 63 and 64, in series, to the grid 65 of the tetrode. A capacitor 66 connects the grid 65 to the line 34. The contact arm 67 of a potentiometer 68 is connected to the connection between the resistors 63 and 64, while one end of the potentiometer is connected through a resistor 69 to the connection between the rectifier 38 and the resistor 39. A switch 71 is connected between the contact arm and the said one end of the potentiometer.

A switch 72 is connected on one side to the line 22 and on the other side to one side of a normally-closed contactor 73 of a relay 74 having a coil 75; the other side of the contactor is connected through a light bulb 76 to the line 23. The junction between the switch 72 and the contactor 73 is connected to one side of a normally-closed contactor 77 of the relay 51, the other side of the contactor 77 being connected to a point between the light bulb 76 and the contactor 73. The junction between the switch 72 and the contactor 73 is connected through a limit switch 78 to one end of the coil 75 of the relay 74, the other end of which is connected to the line 23. A normally-open contactor 79 of the relay 74 is connected across the limit switch 78. The junction between the switch 72 and the contactor 73 is also connected to one end of the main field coil 81 of the motor 62, which is of the shaded pole induction type; the other end of the coil 81 is connected to the line 23.

A normally-open contactor 82 of the relay 51 is connected on one side to one end of the coil 17 of the relay 16, the other end of which is connected to the line 23. A switch 83 is connected between the line 22 and the junction between the contactor 82 and the coil 17. The motor 62 is provided with a "down" shading coil 84 and an "up" shading coil 85. One end of the coil 85 is connected to one end of the coil 84; the other end of the coil 85 is connected to the line 22. The other end of the coil 84 is connected through a normally-closed contactor 86 of the relay 74 to the junction between the two shading coils. The said junction is also connected to one side of a normally-open contactor 87, the other side of which is connected to one side of a normally-closed contactor 88 of the relay 49.

The switches 71, 72 and 83 are connected together mechanically and are movable together from a closed, calibrating position to an open, running position.

The operation of the apparatus will now be readily understood in view of the above description. Let it be supposed that the operator of a grinding machine has just finished setting up the machine for work on a new workpiece and he contemplates running the machine for a long period of time. Eventually, the wheel will become "loaded" with metal and the finish it produces will be poor; at the same time the load on the motor will increase. Therefore, the operator wishes the machine to shut down when this happens. Generally speaking the apparatus of the invention measures the load on the main motor and shuts down the motor when the load exceeds a preselected amount; according to the invention, this preselected amount equals the highest value of load reached during a trial cycle plus a small overload percentage. So, the operator throws the switches 71, 72 and 83 together into "Calibrate" position, at which time they are then closed. Then, he starts up the machine and runs it through a cycle. The current flowing through the line 13 is indicative of the load on the main motor 10, through the medium of the transformers 19 and 27, the value of this current appears on the secondary 28 as a voltage. This voltage becomes the voltage from the cathode 55 to the plate 47 of the tetrode. At the same time, the grid voltage, i.e., the voltage between the cathode 55 and the grid 65 is determined by the setting of the contact arm 59 on the potentiometer 57. When the grid voltage becomes high enough, the tube will fire; then, current passes through the coil 49 of the relay 51 and energizes it, thus opening the contactor 82, de-energizing the coil 17 and opening the contactors 14 and 15 to shut down the motor 10. However, when the operator throws the switches 71, 72 and 83 into the calibrate position, the tube does not fire in this manner. Instead the light 76 indicates the calibrating condition of the machine. Current immediately passes through the main field coil 81 of the motor 62; since the contactor 86 is normally closed, the "down" coil 84 is energized and the motor through the shaft 61 turns the contact arm 59 of the potentiometer 57 toward the "low" or zero resistance end. When the contact arm reaches the low end, it strikes the limit switch 78 and closes it. This causes the coil 75 of the relay 74 to be energized; this opens the contactor 73, which, however, does not shut off the light 76 because of the alternative circuit provided through the normally-closed contactor 77. The actuation of the relay 74 also closes the contactor 79 to form a holding circuit for the coil 75 and its relay. Lastly, the energization of the relay 74 closes the contactor 87 and opens the contactor 86, so that the motor 62 is reversed and it drives the contact arm 59 of the potentiometer 57 from zero toward higher values of resistance. Eventually, the higher values of voltage emanating from the potentiometer cause the firing value of grid bias to be reached; then, the tube fires, the relay 51 is energized and the contactor 88 is opened. Since neither of the shading coils 84 and 85 are energized, the motor 62 remains at a standstill. The opening of the contactor 82 does not, however, de-energize the coil 17 because there is an alternative closed circuit through the switch 83; therefore, the motor 10 is not stopped. If at any time the load on the motor 10 is larger than it was when the motor 62 was shut off as above described, the tube 48 becomes non-conductive, the relay 51 becomes de-energized and the coil 84 is energized. The motor 62 then drives the potentiometer 57 to higher values of resistance until the tube fires again and the motor is stopped. This procedure occurs several times and at the end of the cycle, the contact arm on the potentiometer rests at such a position that the tube 48 will fire when the voltage on the coil 28 reaches the value corresponding to the highest load reached during the calibrating cycle.

At the end of the calibrating cycle, which may be a finishing operation on a workpiece in a machine tool, the operator opens the switch combine, thereby shutting off the lamp 76 and de-energizing the relay 74. The switch 71 is opened, thus throwing the resistance of the potentiometer 68 in series with that of the potentiometer 57; this means that the tube will fire only when a load is reached which is somewhat higher than the highest load reached during the calibrating cycle. The amount by which this load is exceeded before the main motor 10 is shut off is dependent upon the setting of the potentiometer 68 which is preferably calibrated in percentage overload.

The successive cycles of machine operation then continue until the selected overload value is reached and the tube 48 fires to cut off the motor 10. It should be noted that, whereas during the calibrating cycle the main motor is not shut off, in the ordinary cycles there is no alternate circuit through the switch 83 so that the relay 16 is de-energized when the contactor 82 is opened.

In the circuit shown for the measurement of the load on the motor 10, no account has been taken of the reactive component of the current. When a more accurate indication of the motor load is desired, the arrangement shown in the patent of Dunigan No. 2,722,648 may be used.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention having been thus described, what is claimed as new and desired to secure by Letters Patent is:

1. Apparatus for use with a machine tool which operates in cycles driven by a main motor, comprising a relay for terminating the energization of the main motor, a current transformer producing a voltage signal proportional at any time to the load on the main motor, a potentiometer for determining a preselected voltage, a calibrating motor connected to the potentiometer for adjusting the value of the preselected voltage, a gas-filled tetrode to which the transformer and the potentiometer are connected, the coil of the relay residing in the plate circuit of the tetrode, the tetrode becoming conductive and energizing the relay when voltage from the transformer exceeds the voltage from the potentiometer by a predetermined amount, means for setting the potentiometer during a cycle of the machine, the said means setting the potentiometer in such a manner that the tetrode will fire during one of the later successive cycles when the transformer voltage reaches the greatest value reached during the said cycle, and means operative during the said cycle to prevent the relay from terminating the energization of the motor.

2. Apparatus for use with a machine tool which operates in cycles driven by a main motor, comprising a relay for terminating the energization of the main motor, a current transformer producing a voltage signal proportional at any time to the load on the main motor, a potentiometer for determining a preselected voltage, a reversible calibrating motor connected to the potentiometer for adjusting the value of the preselected voltage, a gas-filled tetrode to which the transformer and the potentiometer are connected, the tetrode becoming conductive and energizing the relay when voltage from the transformer exceeds the voltage from the potentiometer by a predetermined amount, a reversible motor for setting the potentiometer during a cycle of the machine, the said means setting the potentiometer in such a manner that the tetrode will fire during one of the later successive cycles when the transformer voltage reaches the greatest value reached during the said cycle, and means operative during the beginning of the calibrating cycle to cause the reversible calibrating motor to set the potentiometer at zero resistance and then to increase the resistance in accordance with the load experienced during the said cycle.

3. Apparatus for use with a machine tool which operates in cycles driven by a main motor, comprising a relay for terminating the energization of the main motor, a current transformer producing a voltage signal proportional at any time to the load on the main motor, a first potentiometer for determining a preselected voltage, a calibrating motor connected to the potentiometer for adjusting the value of the preselected voltage, a gas-filled tetrode to which the transformer and the potentiometer are connected, the tetrode becoming conductive and energizing the relay when voltage from the transformer exceeds the voltage from the potentiometer by a predetermined amount, means for setting the potentiometer during a cycle of the machine, the said means setting the potentiometer in such a manner that the tetrode will fire during one of the later successive cycles when the transformer voltage reaches the greatest value reached during the said cycle, and an overload potentiometer in series with the effective portion of the first potentiometer and arranged to be shorted out during the said cycle.

4. Apparatus for use with a machine tool which operates in cycles driven by a main motor, comprising a relay for terminating the energization of the main motor, a current transformer producing a voltage signal proportional at any time to the load on the main motor, a potentiometer for determining a preselected voltage, a reversible calibrating motor connected to the potentiometer for adjusting the value of the preselected voltage, a gas-filled tetrode to which the transformer and the potentiometer are connected, the coil of the relay residing in the plate circuit of the tetrode, the tetrode becoming conductive and energizing the relay when voltage from the transformer exceeds the voltage from the potentiometer by a predetermined amount, a reversible motor for setting the potentiometer during a cycle of the machine, the said means setting the potentiometer in such a manner that the tetrode will fire during one of the later successive cycles when the transformer voltage reaches the greatest value reached during the said cycle, means operative during the said cycle to prevent the relay from terminating the energization of the main motor, means operative during the beginning of the said cycle to cause the reversible calibrating motor to set the potentiometer at zero resistance and then to increase the effective resistance in accordance with the load experienced during the cycle, and an overload potentiometer in series with the effective portion of the first potentiometer and arranged to be shorted out during the said cycle.

5. Apparatus for use with a machine tool which operates in cycles and which is driven by a main motor, comprising a relay for producing a control function, a current transformer producing a signal proportional at any time to the load on the main motor, a variable resistor for determining a pre-selected reference signal, a calibrating motor connected to the variable resistor for adjusting the value of the pre-selected reference signal, a regulating means to which the transformer and the variable resistor are connected, the coil of the relay residing in a portion of the regulating means, the regulating means becoming operative and energizing the relay when the signal from the transformer exceeds the signal from the variable resistor by a predetermined amount, a means for setting the variable resistor during a calibrating cycle of the machine, the said means for setting the variable resistor operating in such a manner that the regulating means will become operative during succeeding cycles only when the transformer signal reaches the greatest value during the said calibrating cycle, and means operative during the said calibrating cycle to prevent the relay from producing the control function.

References Cited in the file of this patent

UNITED STATES PATENTS

| | | |
|---|---|---|
| 2,229,448 | Garman | Jan. 21, 1941 |
| 2,539,123 | Dudley | Jan. 23, 1951 |
| 2,722,648 | Dunigan | Nov. 1, 1955 |